United States Patent [19]
Norris

[11] Patent Number: 5,897,199
[45] Date of Patent: Apr. 27, 1999

[54] TWIST LIGHT

[76] Inventor: Kenneth Edward Norris, 61352 Tombstone Dr., Montrose, Colo. 81401

[21] Appl. No.: 08/935,379

[22] Filed: Sep. 22, 1997

[51] Int. Cl.⁶ ..................................... F21V 17/02
[52] U.S. Cl. ........................ 362/191; 362/269; 362/376; 362/396
[58] Field of Search ..................... 362/190, 191, 362/269, 285, 287, 399, 376, 427, 396

[56] References Cited

U.S. PATENT DOCUMENTS 3,828,181  8/1974  Goodwin .................................. 362/376
4,470,106  9/1984  Norton .................................... 362/285

Primary Examiner—Y. Quach

[57] ABSTRACT

A device for positioning a trouble light to cast light on a desired work area utilizing an adjustable rotational friction mechanism, and a support plate having a flat surface on its periphery and a hook rigidly attached to the support plate.

15 Claims, 2 Drawing Sheets

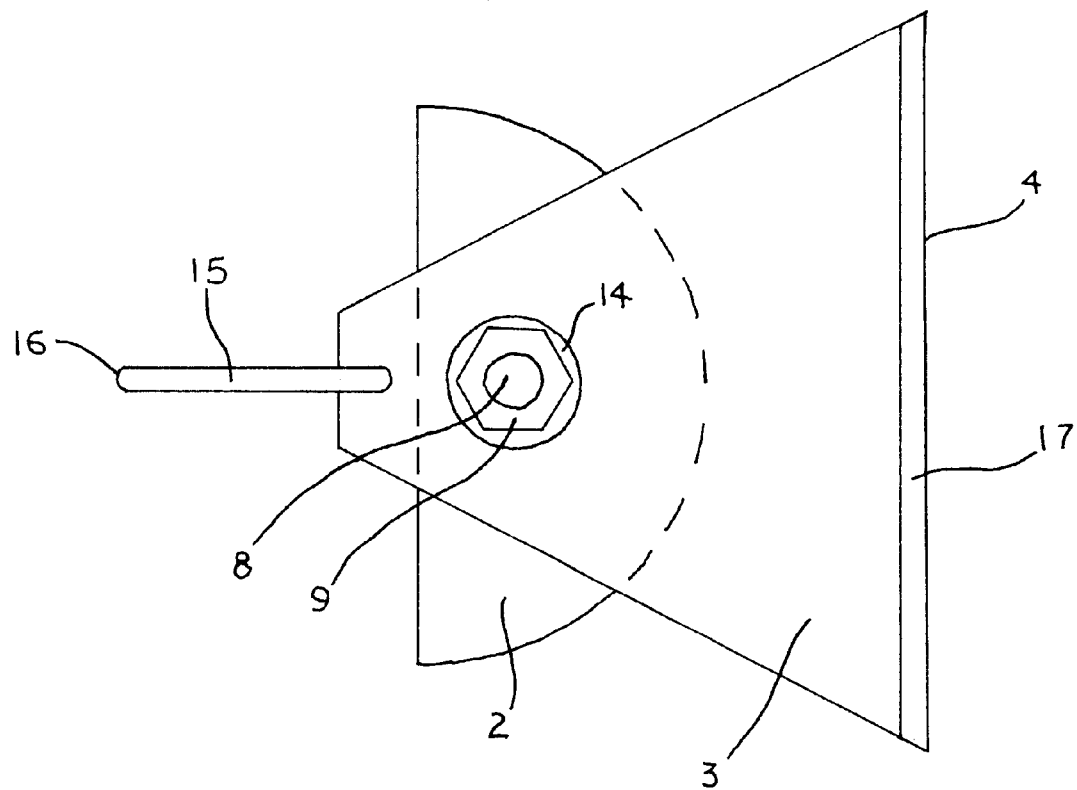

TWIST LIGHT

BACKGROUND OF THE INVENTION

1. Field of the Invention

The invention relates generally to a device to allow a trouble light to be easily positioned in a work environment to cast light on the area needing to be lighted.

2. Description of the Prior Art

Currently, trouble lights are not designed to allow the worker to easily position the trouble light in a work environment. Many trouble lights have rigid hooks at the top or hooks which are difficult to rotate. Trouble lights currently have bulb guards which are of a fixed design and cannot be easily positioned to cast light where necessary.

SUMMARY OF THE INVENTION

The invention relates to a device which can be inexpensively manufactured to position a trouble light to cast light where desired. This invention attaches to a trouble light and can be supported on or fixed to another object in the work area by means of a flat surface, hook or magnet. Once supported on or fixed to another object this invention uses a positioning mechanism that is adjustable as to rotational position and rotational resistance so the light will shine where it is needed and will continue to shine where it is needed even when repeatedly bumped in a work environment.

It is an object of this invention to provide a device for adjusting the lighting direction of a trouble light which is easy to manufacture and install and which will fit most of the trouble lights currently in production.

BRIEF DESCRIPTION OF THE DRAWINGS

FIG. 3 is a plan view of the embodiment of the Twist Light.

DESCRIPTION OF THE PREFERRED EMBODIMENTS

Figure 1:
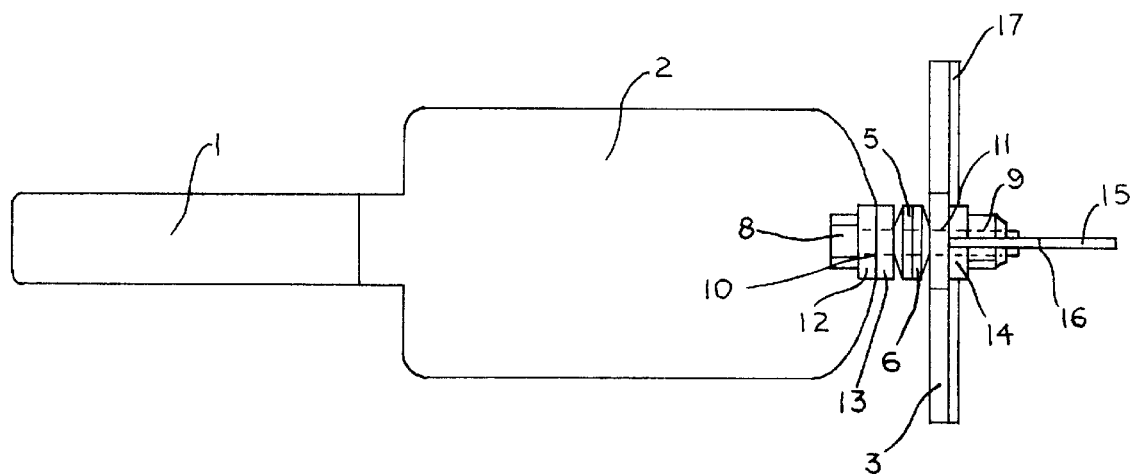
FIG. 1 is an elevation view showing an embodiment of the Twist Light.
Figure 2:
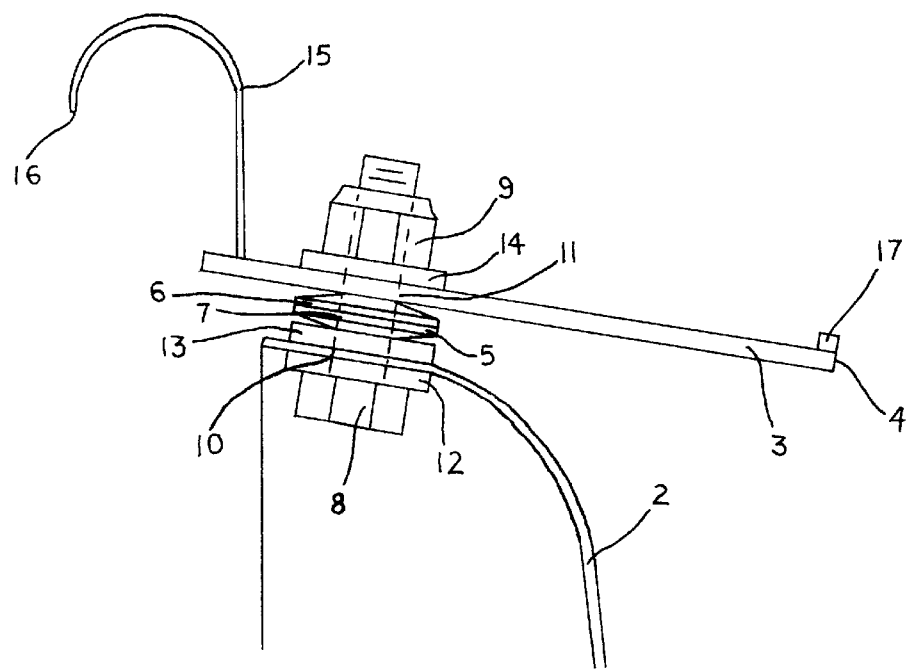
FIG. 2 is another elevation view of the embodiment of the Twist Light.

Referring to FIGS. 1,2 and 3, an embodiment of the invention is shown in which the Twist Light is attached to the bulb guard 2 of the trouble light. The trouble light is comprised of a handle 1 and a bulb guard 2.

In this embodiment the material of the bulb guard forms an opening 10 which has been drilled, molded or otherwise formed in the top portion of the bulb guard 2. A rigid washer 12 is positioned on a threaded member which in this embodiment is a male threaded member 8 and the male threaded member 8 is inserted through the material of the bulb guard that forms an opening 10 in the bulb guard 2 from the handle 1 end of the bulb guard 2. A second rigid washer 13 is positioned over the male threaded member 8 with the bulb guard 2 positioned between the rigid washer 12 and second rigid washer 13.

An elastic member 5 with its material forming an opening 7 is positioned over the male threaded member 8. A second elastic member 6 is positioned over the male threaded member 8. In this embodiment the elastic member 5 and second elastic member 6 are sealing washers. The sealing washers are conical steel washers with elastic washers affixed to one side of them. In this embodiment the sealing washers are positioned with the elastic material of each sealing washer resting on the elastic material of the other sealing washer, with the conical steel portions of the sealing washers extending upwardly and downwardly from the elastic portions of the sealing washers. Sealing washers are typically used where a washer is needed which will provide a water tight connection. This embodiment provides a new application for a sealing washer. Any form of elastic material can be used with any combination of rigid washers or elastic washers. A belleville spring can also be used in place of the sealing washers. The elastic members provide the constant axial force within the device to cause a pre-determined, adjustable, constant friction between the surfaces which rotate relative to each other, which makes the magnitude of rotational friction resistance adjustable and controllable. Because of this elastic means, rotational surfaces of the device can wear with little effect on the magnitude of rotational resistance.

In this embodiment there is a support member 3 where the material of the support member forms an opening 11 which is placed over the male threaded member 8 and rests on the second elastic member 6 The support member 3 shown is in the shape of a plate and has a flat surface 4 on its periphery which allows it to be supported by other objects and surfaces such as structural members, floors and parts of equipment. When this flat surface 4 is in contact with another object the flat surface 4 is fixed against that object and allows the bulb guard 2 to be adjusted relative to the support member 3. A magnet member 17 can be attached to the support member 3 to improve the utility of the support member 3.

A hook member 15 is rigidly attached to the support member 3 on the top of the support member 3 at a location on the opposite side of the support member 3 from the flat surface 4 on the periphery of the support member 3. The hook member tip 16 extends away from the flat surface 4 which allows the hook member 15 to be easily attached to other objects to fix the support member 3 in a position. The bulb guard 2 can then be moved relative to the support member 3 to cast light in a desired direction.

Many work tasks will require the support member 3 to be supported at times by the flat surface 4 on its periphery and then by the hook member 15. Many times the method of supporting the support member 3 will alternate throughout the work task as necessary to keep the optimum lighting on the work areas.

In the embodiment a third rigid washer 14 is positioned on the male threaded member 8 and rests on the top surface of the support member 3. A female threaded member, in this embodiment a lock nut 9, is rotateably attached to the male threaded member 8 above the support member 3 and comprises the locking means. The female threaded member is tightened on the male threaded member 8 compressing the elastic member 5 and the second elastic member 6 and preloading the elastic compression mechanism causing rotational friction resistance on the rotational surfaces of any part that rotates relative to another surface. This device is adjustable as to the magnitude of rotational friction resistance by the torque applied to the threaded members and the resulting preload of the device. This device may be adjusted for rotational friction resistance by the user simply by tightening or loosening the threaded members. In this embodiment the positioning means and the elastic compression mechanism comprise the elastic member 5 and related components to achieve positioning.

This device will work with any sequence of stacking of the various components on the male threaded member 8.

Although one detailed embodiment of the invention is illustrated in the drawings and previously described in detail, this invention contemplates any configuration and design of components which will accomplish the equivalent result.

This invention contemplates a device which can be marketed as an integral part of the trouble light, marketed as an integral part of the bulb guard, or marketed as a stand alone device which can be installed by the purchaser to the trouble light or bulb guard.

I claim:

1. A positioner, for a trouble light having a handle and a bulb guard, which comprises:
   (a) a support member having a periphery, the support member periphery having at least one flat surface on supporting the support member: and
   (b) a positioning means which provides adjustable rotational frictional resistance through an elastic compression mechanism comprised of at least one elastic member and the elastic compression mechanism further comprised of a threaded member and a female threaded member to compress the elastic member, the positioning means attaching the support member and the trouble light and allowing the trouble light to be adjusted to different positions to cast light.

2. A trouble light positioner as recited in claim 1, which:
   (a) the elastic member having an opening therethrough;
   (b) the threaded member comprised of a male threaded member positioned axially through the opening of the elastic member; and
   (c) the female threaded member which rotateably fits on the male threaded member and axially compresses the elastic member between the male threaded member and the female threaded member to provide a compressive force within the elastic compression mechanism, creating adjustable rotational friction by how tight the male threaded member and female threaded member are tightened.

3. A trouble light positioner as recited in claim 2, in which the female threaded member comprises a locking means to secure the elastic compression mechanism at a level of rotational friction resistance.

4. A trouble light positioner as recited in claim 3, in which the locking means is a lock nut.

5. A trouble light positioner as recited in claim 2, in which the bulb guard has an opening through which the male threaded member extends, the positioning means to the bulb guard by means of the male threaded member and female threaded member clamping the elastic member having an opening through which the male threaded member extends, the support member has an opening through which the male threaded member extends, and the female threaded member and the bulb guard clamping the positioning means to the support member attached to the male threaded member and the bulb guard.

6. A trouble light positioner as recited in claim 5, wherein the support member is a plate, and at least one rigid washer axially positioned on the male threaded member to enhance rotational resistance.

7. A trouble light positioner as recited in claim 1, wherein the positioning means attaching the support member to the trouble light is attached through a top portion of the bulb guard.

8. A trouble light positioner as recited in claim 1, in which the elastic member comprises at least one sealing washer.

9. A trouble light positioner as recited in claim 1, in which the elastic member comprises at least one elastic washer.

10. A trouble light positioner as recited in claim 1, in which the elastic member comprises at least one belleville spring.

11. A trouble light positioner as recited in claim 1, further comprising a hook member integral with the support member to allow the support member to be anchored by hooking the hook member to another object.

12. A trouble light positioner as recited in claim 11, in which the hook member further comprises a hook tip and the hook member is rigidly attached to the support member at a location on the support member opposite the flat surface on the periphery with the hook tip extending away from the flat surface on the periphery.

13. A trouble light positioner as recited in claim 1, further comprising a magnet member attached to the support member at the flat surface on the periphery.

14. A device for a trouble light having a bulb guard which comprises:
   (a) a support member of a plate shape having a periphery, the support member periphery having at least one flat surface with the support member having an opening therethrough;
   (b) the bulb guard having an opening therethrough;
   (c) at least one elastic member comprising a material having an opening therethrough;
   (d) a male threaded member positioned through the bulb guard opening, through the opening of the material of the elastic member and through the support member opening allowing rotation of the bulb guard about the male threaded member and resulting in rotation of the bulb guard relative to the support member: and
   (e) a female threaded member rotateably fastened to the male threaded member to complete the attachment of the support member, the bulb guard and the elastic member, with the magnitude of rotational frictional resistance, on the elastic member, set by the amount of torque applied to the male threaded member and the female threaded member.

15. The device as recited in claim 14, further comprising a hook member comprising a hook tip, with the hook member rigidly attached to the support member at a location on the support member opposite the flat surface on the periphery of the support member, with the hook tip extending away from the flat surface on the periphery of the support member to allow the support member to be anchored by hooking the hook member to another object.

* * * * *